Figure 1:
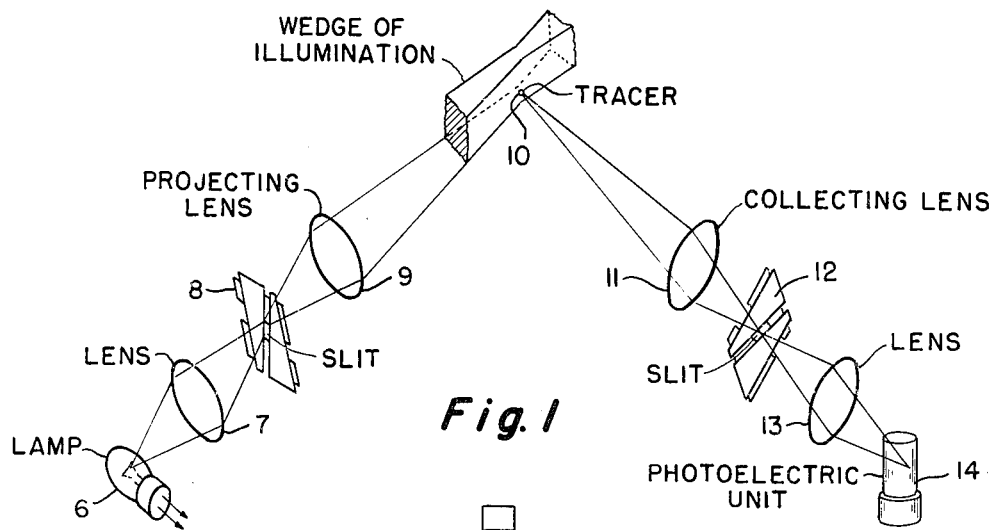

Aug. 10, 1965    W. A. STEWART    3,199,346
METHOD AND APPARATUS FOR MEASURING FLOW
Filed Jan. 29, 1960    3 Sheets-Sheet 1

INVENTOR.
William A. Stewart
BY Webb, Mackey + Burden
HIS ATTORNEYS

INVENTOR.
William A. Stewart
BY Webb, Mackey + Burden
HIS ATTORNEYS

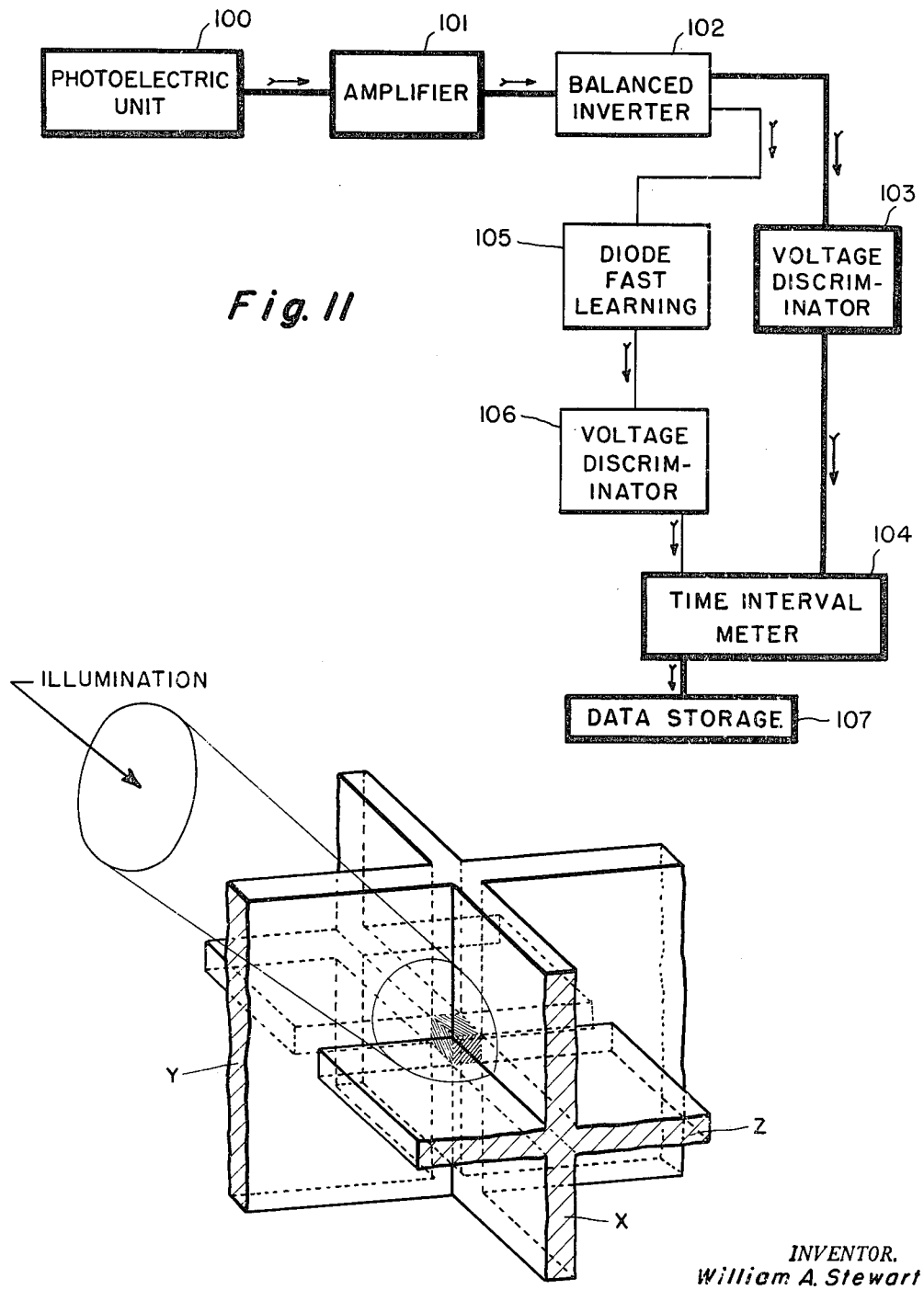

United States Patent Office 3,199,346
Patented Aug. 10, 1965

3,199,346
METHOD AND APPARATUS FOR
MEASURING FLOW
William A. Stewart, 107 Mahoning Drive,
Pittsburgh 35, Pa.
Filed Jan. 29, 1960, Ser. No. 5,559
15 Claims. (Cl. 73—194)

The present invention is directed to a method and apparatus for measuring the flow of gas and liquids. Flows of liquids and gases are partly classified into two types of flows: (1) turbulent, and (2) laminar. These types of flows can be additionally broken down into steady or unsteady flows. The turbulent and laminar flows can have characteristics of both steady and unsteady types of flow. There are many known devices for investigating and measuring these flows, however, these devices which are in wide and general use involve the use of a probe placed into the flow area under investigation and thus inherently interfere with the flow characteristics of the liquid and gas which are being investigated. The known devices and methods which utilize probes for measuring flow also interfere with heat and mass diffusion within the flow area under investigation. These known devices include the Pitot tube, impact tube, total head tubes, and hot wire anemometers. In addition, there are photographic and optical techniques for measuring flow which have not achieved any substantial commercial success due to limitations on the accuracy which can be obtained with these techniques.

My invention involves a system which does not interfere with the flow of the liquid or gas which is under investigation and evaluation. My method can accurately measure all types of flows and is particularly adapted for the measurement of shear flows or boundary layer flows which may be generally classified as a fluid flow within .001–.250 inch of a wall of a body.

My invention obviates the many deficiencies of the known devices and methods for measuring flow in that there is no interference with the flow area under study, high resolution and reliability is achieved, and the flow measurements can be made extremely rapidly and with great accuracy. My method and apparatus is convenient in use and can be used in evaluating all types of flow whether or not involving a corrosive or non-corrosive liquid or gas since no part of my apparatus is in contact with the liquid or gas.

My method and apparatus functions by taking a direct measurement of the flow, that is, the measurement is not based upon other factors such a cooling effect which is the basis for hot wire anemometry or a measurement of the square of velocity which is the basis for Pitot tubes. Thus, my method obtains a direct measurement of the desired flow velocity without resort to the necessity of having a calibrated known velocity to which the measured quantity must be compared and calculated. All of the accepted known techniques and devices require a known standard with which to compare and evaluate the measurement then being taken.

A further limitation of the known methods and devices is that the velocity measurements which they obtain must often be taken from relatively large volumes and over long paths of the flow. My device can measure flow over any length path subject solely to practical considerations and devices available to make such measurements. These considerations are always such as to make volumes and paths smaller than those possible with known devices and methods. Thus, my invention covers a wider range of usefulness and can measure flow areas which can not be investigated effectively with known devices.

Figure 2:
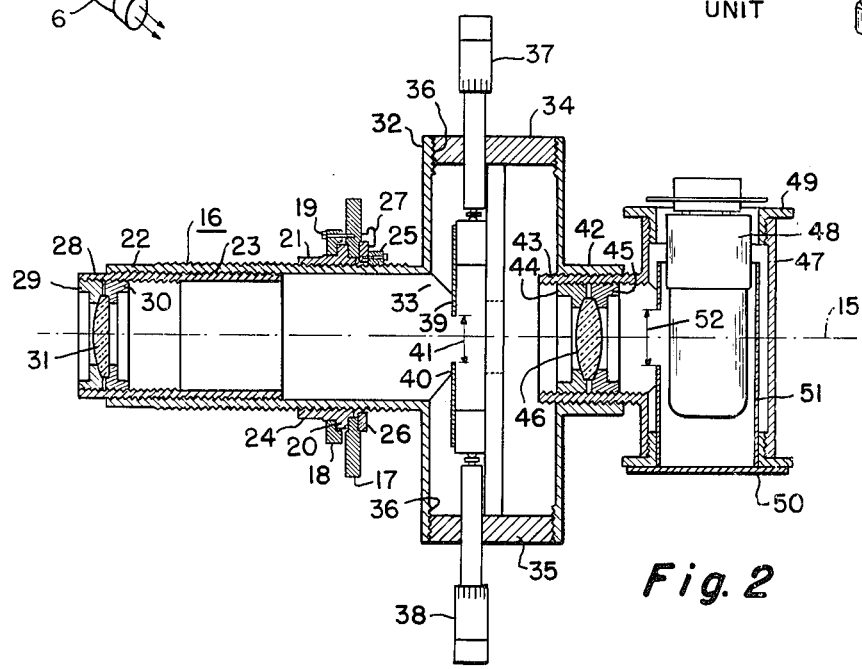
Figure 3:
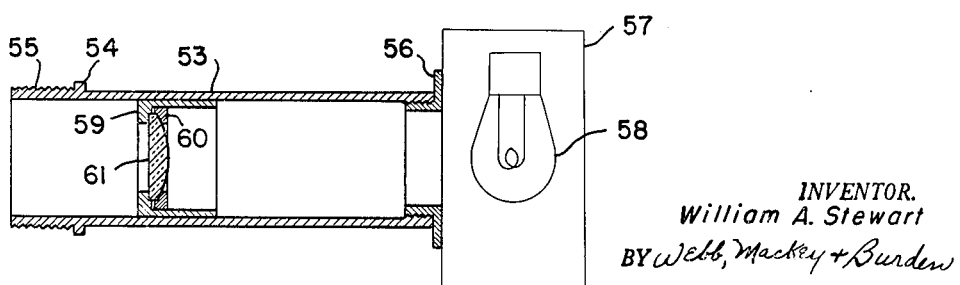
Figure 4:
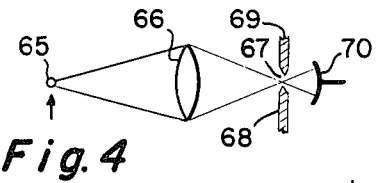
Figure 5:
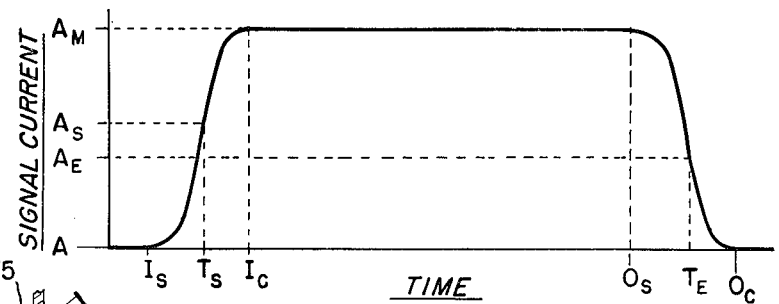
Figure 6:
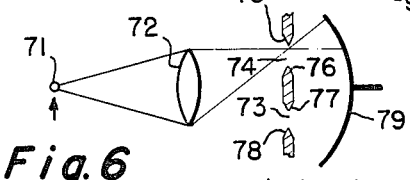
Figure 7:
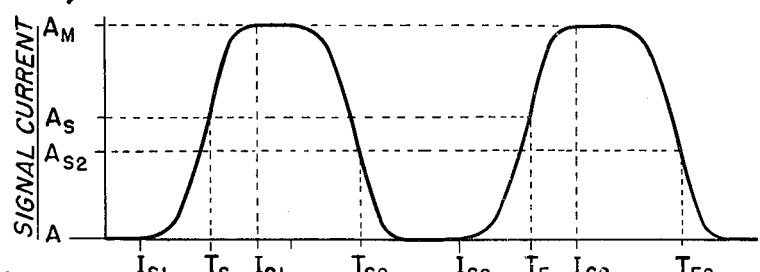
Figure 8:
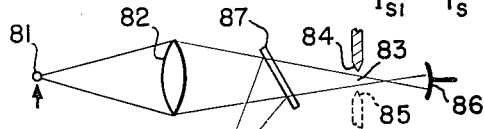
Figure 9:
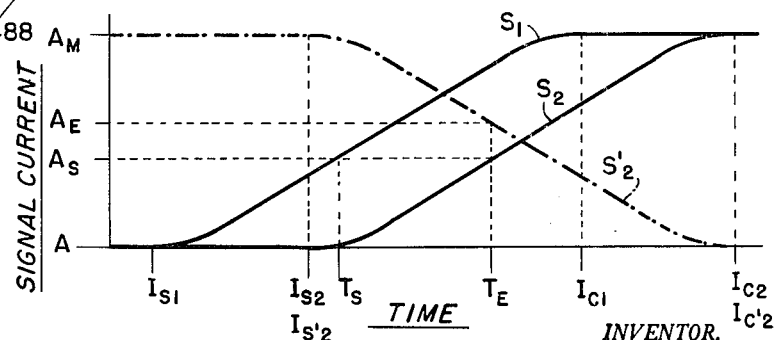

In the drawings I have described a present preferred embodiment of my invention in which:

FIGURE 1 is a schematic of one form of my invention;
FIGURE 2 is a longitudinal cross-section through a viewing part of my apparatus;
FIGURE 3 is a longitudinal cross-section through a projecting part of my apparatus;
FIGURE 4 is a schematic of my invention;
FIGURE 5 is a signal obtained in my invention, wherein the abscissa is in time and the ordinate in signal current;
FIGURE 6 is a schematic of a modified form of my invention;
FIGURE 7 is a signal obtained by the form of my invention shown in FIGURE 6, wherein the abscissa is time and the ordinate is signal current;
FIGURE 8 is a schematic of a second modified form of my invention;
FIGURE 9 is a signal obtained by the form of my invention shown in FIGURE 8, wherein the abscissa is time and the ordinate is signal current;
FIGURE 10 is an isometric of a flow area in a third modified form of my invention; and
FIGURE 11 is a flow sheet of an electronic portion of my invention.

Briefly, my invention includes the introduction of a tracer into a flow which one desires to investigate, the emission or reflection of light from the tracer, and transmission of this light to a sensing device which is activated and records the time interval required for the tracer to traverse a predetermined path. My invention includes both external illumination of the tracer by use of a beam of light directed into the area under study and emission of light from the tracer caused by actuation by heat or stimulus from radio waves, ultraviolet waves, infrared waves, X-rays, or the like.

Referring specifically to FIGURE 1, an incandescent or arc lamp 6, connected to a suitable power source, directs illumination through lens 7 which in turn focuses the illumination at an adjustable or fixed slit 8, and on through a projecting lens 9 which focuses the illumination in a plane within the area of flow under investigation. This illumination is a wedge-shape within the flow area, as shown in FIGURE 10. A tracer 10, moving with the flow, reflects at least part of the illumination to and through a collecting lens 11, an adjustable or fixed slit 12, a second refocusing lens 13, and to a sensing device 14 such as a photo-electric tube. This reflected illumination from the tracer actuates the photo-electric tube to generate a current which is delivered to an electronic circuit to be described hereinafter. The electronic circuit performs the desired functions of measuring the time interval for the image of the tracer to move across the slit 12 (a predetermined distance).

The flow which is under study can be contained within a closed vessel such as a pipe, duct, etc.; within an open vessel such as a river; or can be completely unconfined such as a flow over an air foil or movement within the atmosphere. Flows are generally classified as "internal flow" (wherein the flow is substantially entirely enclosed on all sides), or "external flow" (wherein the flow is not enclosed on all sides). My method and apparatus can measure both "internal" and "external" flows.

This invention can measure the flow of "fluids," by which I mean gases or liquids of any character whatsoever subject to the following limitations: (1) the fluids must be sufficiently transparent to permit the transmission of light which is emitted by or reflected from the tracer in the flow to a sensing device; and (2) the fluids must be free of foreign particles, bodies or other inclusions which will interfere with the proper utilization of this invention.

By the term "tracer" herein I means bodies of materials which are introduced into a flow or are present in a flow and which are optically distinguished from the medium constituting the flow. The tracers can be of any configuration but preferably spherical. The tracers must be of a size sufficiently small to be included entirely within the portion of the flow which one desires to measure. For example, if the velocity distribution of a lateral flow gradient of a particular dimension is desired, the tracer must not be larger than that dimension or the measurement obtained is an average velocity of the lateral flow gradient and an adjacent flow gradient in which the tracer is moving due to its "excess size." As a practical matter, there are no limitations, either upper or lower, on the size of the tracers but rather the size to be used is dependent upon the particular flow measurement which one wishes to obtain. In measuring most fluid and gas flows it is desirable to use a tracer as small as possible since one thereby insures that a complete description of the flow is obtained. Flow gradients which occur in flow volumes smaller than the tracer cannot be measured. A velocity measurement cannot be ascribed to a point in the flow smaller than the tracer.

One requirement which must be fulfilled in the selection of a tracer is that it must respond accurately and rapidly to fluctuation and variations in the flow being measured. To fulfill this requirement, the tracer must have properties and characteristics closely approaching those of the medium (gas or liquid flow) in which it is contained. A further requirement of the tracer is that it must emit or reflect a quantity of light sufficient to be detectable and distinguishable from other conditions and factors which interfere with or modify the light emitted or reflected from the tracer or the response induced in the sensing device by this light. Examples of such interfering factors are the "noise" in the photo-electric tube and electronic circuit which will be described hereinafter, and the light emitted and transmitted from other substances and which also induce a response in the sensing device.

Specific examples of tracers are: (1) air entrained in water flow; (2) water entrained in air flow; (3) rigid hollow plastic spheres contained in air or water flow and filled with the flow material being sudied (these tracers are known as "microballoons"); and (4) oil droplets in air or water flow. These examples are only illustrative of the tracers and it is obvious that the usable tracers are practically unlimited in material of construction, size, shape, density, etc. Primarily, the tracers must conform as closely as possible to the physical properties of the flow in which they are contained.

In the evaluation of tracers for use in my invention, I have found that the following formula (in which the units are consistent) provides a sound basis for determining the tracer's ability to respond rapidly and accurately to changes in velocity and direction within the flow medium in which they are contained:

$$\frac{N}{M} = \left\{1 - \frac{\omega^2}{\omega^2 + G^2}\right\}^{1/2}$$

wherein:

$N$ = the amplitude of the fluctuations or variations of the tracer in the medium,
$M$ = the amplitude of the fluctuations or variations of the flow medium being investigated,
$\omega$ = the frequency of the fluctuations of N and M, $$G = \frac{9\nu\rho}{2a^2(\rho' - \rho)}$$

wherein:

$\nu$ = kinematic viscosity of the flow medium = $\mu$ (absolute or dynamic viscosity of the flow medium) divided by the density of the flow medium,
$a$ = radius of tracer (average radius if not perfect sphere),
$\rho'$ = density of tracer,
$\rho$ = density of fluid.

It is apparent from the above formula that the quantity $N/M$ should be as close to 1 as possible since then the response of the tracer of fluctuations is substantially similar to the actual fluctuations within the flow medium. To approach this value of 1 for the quantity $N/M$, it is apparent that the numerical value of G must be very large. For G to be very large, the difference in densities of the tracer and flow medium must be very small or the radius of the tracer very small or the viscosity of the fluid very large.

The above formulas are approximations and in particular are based upon responses to sine wave type fluctuations; however, I have found these formulas to be useful in choosing tracers.

A more accurate and universal evaluation of a tracer's ability to respond rapidly and accurately to changes in velocity and direction with the flow medium is obtained from the following formula:

$$\left(\frac{\rho^1}{\rho} + \frac{1}{2}\right)\dot{W} - \frac{3}{2}\dot{U} + \frac{9}{2}\frac{\nu}{a^2}(W - U)$$

$$+ \frac{91}{2a}\sqrt{\frac{\nu}{\pi}}\int_0^t \frac{(\dot{W} - \dot{U})}{\sqrt{t-\tau}} d\tau = 0$$

wherein:

$\rho'$ = density of tracer,
$\rho$ = density of flow medium,
$\dot{W}$ = acceleration of the tracer = the velocity of the tracer differentiated with respect to time,
$\dot{U}$ = acceleration of the flow medium = the velocity of the medium differentiated with respect to time,
$\nu$ = kinematic viscosity of the flow medium = the absolute or dynamic viscosity of the flow medium/the density of the flow medium,
$W$ = velocity of the tracer,
$U$ = velocity of the medium,
$a$ = radius of the tracer (average radius if not perfect sphere),
$t$ = time,
$\tau$ = dummy variable of integration associated with time.

While the size of the tracer must be taken into consideration in choosing a suitable tracer, for the reasons discussed above; this size consideration must be balanced against other variable factors involved in my invention. For example, a tracer is used which responds accurately to fluctuations within the flow medium but the tracer does not emit or reflect a sufficient quantum of light to generate a signal which is detectable and distinguishable, it is normally necessary to choose a different tracer thereby sacrificing, to the smallest extent possible, the tracer's ability to respond rapidly and accurately to fluctuation of the flow medium, while increasing the quantum of reflected or transmitted light from the tracer. Before rejecting the initially chosen tracer, it is desirable to attempt to increase the illumination or emission from the tracer by increasing the magnitude of the exciting energy applied to the tracer to effect its light radiation. However, care must be taken to insure that the increase in the magnitude of the exciting force does not materially alter the flow medium which is under investigation. Summarizing, if it is found that the initially chosen tracer, which accurately responds to fluctuations within the flow, cannot be used for any of the reasons discussed herein, it is then necessary to sacrifice some of these desirable response characteristics, while maintaining errors due to this change as small as possible.

The sensing device which I prefer to use for receiving the emitted or reflected light from the tracer is a photo-cell of known construction. These photo-cells require that a minimum quantum of light flux impinge upon the photo-electric surface of the cell to generate a current which is detectable and distinguishable. This quantum of light flux is well-known for each type of photo-cell and thus provides a starting point for selecting a usable tracer based upon consideration of the reflectivity of the tracer and the quantum of light reflected or emitted from the tracer.

I have found that when a tracer is excited by heat, phosphorescent stimulation, induction heating, or the like, to a uniform brightness $b$ the following formula provides an accurate estimation of the correlation between the light emission of the tracer and the type of photo-cell which must be used:

$$\lambda = K \frac{\pi}{4} \frac{D^2}{l^2} a^2 b$$

wherein:

$\lambda$ = the minimum quantum of light flux which must strike the photo-cell being used to provide a usable signal; i.e., a signal which can be detected and distinguished,
$K$ = the ratio of the quantity of light emitted by the tracer to the quantity of light received at the photo-electric surface; i.e., the product of the ratios of light transmitted to light received in each of the mediums through which the light path passes from the tracer to the photo-electric surface ($K$ deducts light losses due to various factors including losses due to (1) absorption of light by an optic interposed in the light path and absorption by the flow medium; (2) optics in the light path which are not sufficiently large to intercept all of the light striking a plane passing vertically downward through the middle of the optic; etc.),
$D$ = diameter of optic (collector optic),
$l$ = the distance from the tracer to the optical center of the collector optic,
$a$ = the radius of the tracer (the average radius when the tracer is not a sphere),
$b$ = brightness per unit area of the tracer.

The units in the above formula must be consistent with each other.

When the tracer is illuminated by light (or otherwise stimulated to emit light in a manner similar to illumination with light), I have found the following formula to be useful in correlating the various factors affecting the choice of a tracer, photo-cell, optics, etc.:

$$\lambda = K R \frac{D^2}{l^2} a^2 \delta \phi$$

wherein:

$\lambda$ = the minimum quantum of light flux which must strike the photo-electric surface of the photo-cell to generate a usable signal (i.e., detectable and distinguishable),
$K$ = the ratio of the quantity of light emitted by the tracer to the quantity of light received at the photo-electric surface; i.e., the product of the ratios of light transmitted to light received in each of the mediums through which the light path passes from the tracer to the photo-electric surface ($K$ deducts light losses due to various factors including losses due to (1) absorption of light by an optic interposed in the light path and absorption by the flow medium; (2) optics in the light path which are not sufficiently large to intercept all of the light striking a plane passing vertically downward through the middle of the optic; etc.),
$R$ = the reflectivity of the tracer; i.e., the ratio of the intensity of the total reflected to that of the total incident light,
$D$ = diameter of optic, (collector optic),
$l$ = the distance from the tracer to the optical center of the collector optic,
$a$ = the radius of the tracer (the average radius if the tracer is not a sphere),
$\delta$ = flux density of light from the direction of illumination $\theta_1$,
$\phi$ = (i) for perfect diffuse reflection:

$$\phi = \frac{1}{4}\left[\frac{2}{3}(\pi - \theta_1)\cos\theta_1 + \frac{1}{3}\sin\theta_1\right]$$

(ii) for perfect specular reflection:

$$\phi = \frac{\pi}{16}$$

(iii) for spread reflection:
intermediate between $\phi$ values in (i) and (ii)
$\theta_1$ = the angle between the central axis of the illumination and the central axis of the collector optic.

In developing the above formula, the assumption was made that the tracer was substantially spherical, however, I conclude that the formula is applicable to various shapes of tracers if an average radius can be determined. Further assumptions were (1) that the tracer was illuminated or stimulated by substantially parallel rays; and (2) $D/l$ is small in numerical value.

By the term "optic" used herein, I include both lenses and mirrors, provided, however, that a mirror substituted for a lens, or vice versa, performs substantially the same function as previously ascribed to the lens or mirror originally used.

I have described the use of my invention under two different situations: (1) when the tracer emits light, and (2) when the tracer reflects light which is supplied from an external illumination source. In the second situation, the quantum of light reflected from the tracer is proportional to the strength of the light source providing the illumination for the area under study. Light sources are known which have a power in excess of $\frac{1}{10}$ the power of the sun. This candle power per unit area of the light source is called "brightness." There is no upper limit on the brightness of the light source which may be used in my invention other than a practical one based on heat generated, space requirements, economies, and the generation of interfering light (called "back light"). The lower limit on the brightness of the external light source is that the brightness must be sufficient to provide an illumination of the tracer such that an activation of the photo-cell will result from the reflected light and the activation is sufficiently large to be detected and distinguished from "noise" and the like in the photo-cell and electronic circuit. Thus, the reflectivity of the tracer, the light losses due to absorption in the optic, the size of the tracer, the noise in the photo-cell and electronic circuit, the type of reflection from the tracer, and many other well-known factors must be considered in determining the minimum brightness of the light source which can be used with a given tracer and optical arrangement.

I have found that the following formula, in which the units must be consistent with each other, provides a good approximation of the necessary brightness of the light source to produce a sufficient $\delta$, and consequently, a sufficient quantum of light described in the formula in column 5, line 43. $\delta$ of the formula below is the same $\delta$ as the formula in column 5, line 43 recites.

$$\delta = \frac{1}{8} \frac{D_p^2}{l_p^2} K_p B$$

wherein:

$B$ = the brightness of the light source (candles/unit area),
$K_p$ = the ratio of the quantity of light projected by the light source to the quantity of light received at the tracer; i.e., the product of the ratios of light projected to light received in each of the mediums through which the light path passes from the light source to the tracer ($K_p$ deducts the light losses due to various factors, including losses due to (1) absorption of light by an optic interposed in the light path and absorption by the flow medium; (2) optics in the light path which are not sufficiently large to intercept all of the light striking a plane passing vertically downward through the middle of the optic; etc.),
$D_p$ = diameter of the projecting optic,
$l_p$ = the distance from the tracer to the optical center of the projecting optic, δ = light flux density at tracer measured in plane perpendicular to axis of projecting optic.

Thus is λ obtained by using the above formula and relating the brightness B to the amount of light flux which must impinge upon the photo-electric surface of the photo-cell to be detectable above the "noise" which is inherently present in the photo-cell and electronic circuit. The causes of this "noise" are diverse. It suffices to state for the present invention that the flux striking the photo-cell must be at least sufficient to be detectable and distinguishable from the "noise" and from the practical standpoint the flux must be at least sufficient so that an economic amplification of the signal generated can be made.

By the term "light" as used herein, I mean any radiation from the tracer which can be detected by a photo-electric surface. A further definition of "light" is any of the wave-lengths of elecro-magnetic radiation which travel in straight lines but may be reflected or refracted in optics. As pointed out above, the tracer can emit light due to activation from an internal or external source. The emissions or reflections from the tracer, which are encompassed within the term "light," may be of any wave-length and not necessarily limited to light waves which are detachable by human vision. I can also activate the tracer with infrared and ultraviolet "light" which is then detected by a photo-electric surface particularly adapted for use in detecting such radiation. I also include within my invention the activation of the tracer with a "light" of one wave-length while the radiation from the tracer is of a different wave-length.

The source used in providing illumination for the area under study preferably is as uniform as possible, although non-uniform sources can be used by defocusing the transmitted illumination which tends to spread and equalize the illumination. Of particular importance is the fact that the tracer must be uniformly illuminated (so far as density per unit area is concerned) during the entire period of passage of the tracer through the area under study. This consideration enters into both the choice of the source and of the tracer since non-uniformity in the source or irregularity in the surface of the tracer can provide non-uniformity of intensity of reflection or emission from the tracer's surface.

The size of the optics and their distance from the point of study are not critical other than from the practical consideration. It is preferable, however, that the diameter of the optics be small and the distance from the optics to the flow area under study very large. This results in economies being effected in purchasing equipment for use in my invention and provides a wider range of application of the invention to the measurement of flows; for example, the optics must have a long focal length if one desires to measure the flow in a pipe having a substantial diameter of the order of 5 feet, if no interference with the flow is to be effected. In making flow measurements within pipes it is necessary that small windows be cut in the pipes and covered with glass. The construction of these windows is well-known and does not interfere with the flow characteristics of the medium within the pipe. The depth of focus of either or both of the collecting lens and/or the projecting lens is preferably 1 to 5 times the length of the path over which measurements are taken of the tracer in motion in the flow. The depth of focus is preferably such that the image of the tracer of the slit is equal to or less than the width of the slit so that greatest accuracy may be attained.

The tracers must be introduced into the flow sufficiently far upstream from the area under study so as to avoid any effects from the introduction on the area under study. The tracers are introduced with either an automatic or hand manipulated device such as a funnel having a release mechanism on the bottom opening to sprinkle tracers into the flow. The specific manner of introduction of the tracers into the flow does not form part of this invention.

As stated heretofore, the tracers may be naturally occurring substances in the flow and thus need not be introduced. If the tracers are naturally occurring substances there is no problem of avoiding the effects of the mode of introduction.

In FIGURE 2 I have shown a cross-section of a preferred embodiment of my invention in which the central axis 15 of the detecting unit 16 extends into the center of the area under study. The detecting unit 16 includes a circular ring 17 which is affixed to a stationary rigid stand (not shown) by bolts. The ring 17 is affixed to a second adjacent ring 18 by threaded bolts 19 in conventional manner. The lower portions of the rings 17 and 18 are machined out to form shoulders enclosing a third circular ring 20 which is affixed to a collar 21. The collar 21 is circular and extends completely around a hollow elongated tubular housing 22. The inner face of ring 21 is threaded to mesh with threads 23 on the outside of the housing 22. The upper face 24 of the ring 21 is knurled to provide a non-slip grip for hand adjustment of the device. The rings 17 and 18 provide a sliding fit between each of them and the ring 20 whereby a person can rotate the ring 21 to move the housing 22 fore and aft of the ring 17 which is affixed to the stand. Thus the entire basic unit 16 is movable for proper location of the focal point of lenses. A key 25 is affixed to a fourth ring 26 which abuts against ring 17 and is fixed stationary relatively to ring 17 by threaded screws 27. The key 25 has a lower portion positioned in a key-way (not shown) extending along the entire length of housing 22. The key 25 prevents rotation of the housing 22 upon manual rotary movement of the sleeve 21 to move the unit fore and aft and directs the housing 22 in a straight path.

The inside face of tubular housing 22 admits a second sleeve 28 which is threadably engaged with threads on the inside of housing 22. The inside of housing 28 is threaded to admit lens holders 29 and 30 in a well-known manner. A lens 31 is rigidly held by the lens holders 29 and 30. The lens 31 as shown in FIGURE 2 is referred to in this application as the "collecting lens."

Both ends of housing 22 are open and the rear of housing 22 is integral with a cross-tube 32 into which it opens at opening 33. The tube 32 contains an adjustable slit mechanism of known construction. This slit mechanism includes end plates 34 and 35 which are threaded into engagement with the threads 36 on the inside surface of the tube 32. The adjustable slit mechanism includes micrometers 37 and 38 rotatably mounted at each end in the end plates 34 and 35. The micrometers are connected in a well-known manner to plates 39 and 40 to adjust the plates toward and away from each other. The edges of the plates 39 and 40 are as parallel to each other as possible and provide a slit opening 41 through which the light emitted or reflected from the tracer passes. The opening 41 is the path through which the movement of the image of the tracer is timed. A fixed slit mechanism (not adjustable) can also be used but does not have the flexible application of the variable slit described above.

Immediately to the rear of tube 32 is another tube 42 which forms a continuation of the housing 22. Tube 42 is integral with tube 32. The inner surface of tube 42 is threaded to admit another tube 43 which contains lens holders 44 and 45 which in turn mount a lens 46 in a well-known manner. The rear of tube 43 is integral with a housing 47 for a photo-electric tube 48. The tube 48 is of well-known construction and contains a photo-electric surface which is activated by light impinging upon it which results in the generation of a measurable current if the light impingement is sufficiently large. The housing 47 includes an upper end plate 49 which supports the photo-electric tube 48 and which threads into the upper end of housing 47. The lower end of housing 47 is closed by a similar end plate 50 which threads into the lower end of the housing 47 and contains an integral tubular shield 51 containing a window 52. The tube 51 is rigidly affixed to the end plate 50. Upon rotation of the end plate 50 the shield 51 is rotated to bring the window 52 into position so the transmitted or emitted light from the tracer can strike the photo-electric surface within the tube. When the apparatus is not in use the end plate 50 is rotated to move the window 52 out of the direct rays passing through the lenses 31 and 46.

I have found that the lens 46 is not necessary in the proper operation of my invenion but is merely a preferable feature. The lens 46 functions to refocus the light passing through slit 41 toward the photocell and materially reduces the movement of the light across the photocell during movement of the tracer in the area under study. Photoelectric surfaces are not completely consistent in their response to light impinging upon them and, therefore, it is desirable to maintain the light impinging upon the photo-electric surface in one position as nearly as possible. The lens 46 is so positioned to accomplish this purpose.

FIGURE 3 shows a preferred embodiment of part of my projector unit to proivde illumination in the area under study. The projector unit shown in FIGURE 3 includes an elongated hollow tubular housing 53 of a circular cross-section having radially extending flanges 54 and a peripheral threaded portion 55. A rear collar 56 is threaded within the housing 53 at its rear end. The collar 56 is connected integrally to a lamp housing 57 which contains an incandescent or arc lamp 58 of well-known construction. Lens holders 59 and 60 which mount a lens 61 are positioned in a rigid stationary position within housing 53. The projecting unit shown in FIGURE 3 is used with a structure identical to the front portion of the detecting unit shown in FIGURE 2. The collar 56 threads into tube 42 in the same manner as the sleeve 43 shown in FIGURE 2. Thus, the projecting unit includes the elements shown in FIGURE 3 plus the tube 42, the tube 32, the slit mechanism, the housing 22, the lens 31, and the adjusting mechanism 17, 18, 19, 20, and 21. The lens 31 functions as the projecting lens when it is used in the projecting unit to illuminate the area under study.

All internal surfaces in the various tubes and housings of FIGURES 2 and 3, which are not threaded, are blacked to eliminate stray light paths which may give rise to erroneous signals.

FIGURE 4 shows my basic measuring system which includes a tracer 65 carried in the flow under investigation in the direction of the arrow shown. Tracer 65 may be illuminated by an arc or straight filament incandescent light or may emit light due to stimulation by heat, electro-magnetic radiation, or the like. The light emitted is reflected from the tracer, travels to the lens 66 which focuses the image of the tracer within a slit 67 formed by two opaque plates 68 and 69 which have substantially parallel edges to form a slit 67. In essence, the plates 68 and 69 theoretically form two parallel planes within the area under investigation and thereby define the path which the tracer 65 traverses. The space included between two such planes is called "a viewing sheet." During the movement of the tracer along with the flow under investigation between these two theoretical planes, the light reflected by the tracer is transmitted through the slit 67 and to a photo-electric surface 70, preferably that of a high-gain photo-multiplier sensing element which responds to very small amounts of incident light, thereby permitting the tracer sizes to be small, optical sizes to be small, and the distances from the optics to the point under study to be relatively large. The signal generated on the photo-electric surface of the tube has a duration corresponding exactly to the time period of flight of the tracer over the measured distance within the viewing sheet and formed by the plates 68 and 69 in the form of two theoretical planes within the area under study. The electrical signal from the photo-electric surface is then applied to a digital or other electronic time interval meter which will be described hereinafter.

There is no practical lower limit for the distance between the parallel adjacent edges of the plates 68 and 69 which form the width of the slit 67 and a practical dimension of .01 inch. It is important to know that the width of a slit when projected should not be larger than the width of the area which one desires to study in the flow. Likewise, it is preferable that the tracer be smaller than the width of the slit, although I describe apparatus hereinafter which measures the velocity of tracers larger than the width of the slit.

Time can be measured accurately to at least $\frac{1}{10}$ of a microsecond. So for a velocity measurement of 10 feet per second, and a length of path of .001 feet, time is known to an accuracy of $\frac{1}{10}$ of 1%. For example, if the main flow velocity is 10 feet per second, and the turbulent component is 10%, the turbulent component would be known to 1% accuracy. Generally speaking, the slower the flow and the larger the component distance, the greater is the relative accuracy of the system.

From the above description I have shown that the length of path over which the movement of the tracer is timed is determined by the slit width 67, however, it is within the scope of this invention to define this path by the illumination provided to the area under study rather than a slit in the sensing mechanism such as shown in FIGURE 4. Thus, if the area under study is illuminated within a limited area and the length of this area is known in the direction in which one desires to measure the component of velocity, a photo-electric cell can receive the reflected light from the tracer and it is not necessary to provide the slit 67 in front of the photo-electric cell to define the path. However, the accuracy of the measurement is greater when the path is defined by a slit 67 in front of the photo-electric cell rather than a slit in front of the illuminating means such as shown in FIGURE 1.

Likewise, I can utilize a slit in front of the projecting device and also a slit in front of the photo-electric cell in the manner shown in FIGURE 1. A distinct advantage arises from the use of two slits in that background light which interferes with the detection of the reflected light is reduced, and the depth of illumination of the area under study is much lower thereby avoiding detection (at the photo-electric cell) of tracers or foreign bodies which are not within the depth of focus of the collector lens. Stated another way, the use of the slit in the projecting medium materially reduces the area illuminated in the flow under study and likewise reduces the possibility of error due to the measurement on tracers which are not within the exact field of study.

FIGURE 5 depicts the signal generated by the passage of the tracer across the slit (or the viewing sheet which the slit forms in the area under study). The portion $I_s$–$I_c$ depicts the increase in the signal current as the tracer image enters the slit. Thus as the image enters the slit the current generated increases. When the tracer image is wholly within the slit the signal current is a maximum value $A_m$ in the time period $I_c$–$O_s$. Likewise, as the tracer image leaves the slit, the light flux striking the photo-electric surface decreases and the signal current decreases as depicted by the portion of the curve from $O_s$–$O_c$. The curve $O_s$–$O_c$ is identical but inverted to the curve $I_s$–$I_c$. To determine the period of time which was required for the tracer image to pass completely across the width of the slit an arbitrary point is chosen on the curve $I_s$–$I_c$, for example, the point depicted by the coordinate $A_s$ and $T_s$. The distance from A to $A_s$ is then measured. Likewise, an identical point on the curve $O_s$–$O_c$ is determined by measuring down a distance from $A_m$ vertically downward to locate the point $A_e$ and $T_e$. Thus, the distance $A$–$A_s$ is equal to $A_m$–$A_e$. The time from $T_s$ horizontally along the time coordinate to $T_e$ is the time period required for the tracer image to move across the slit.

I have shown in FIGURE 6 a modified form of my invention, but one which utilizes the basic concept of the configuration shown in FIGURE 4. A tracer 71 is moving with the flow to be measured. Light is emitted or reflected from the tracer to an optic 72 which in turn refocuses the image of the tracer at either the slit 73 or the slit 74. The slit 74 is formed by a slit edge 75 and a second slit edge 76. The slit 73 is formed by a slit edge 77 and a second slit edge 78. A photo-electric surface 79 is activated by any light impinging upon it. As the tracer moves with the flow in the direction of the arrow shown in FIGURE 6 the optic 72 focuses the image of the tracer at the slit edge 75 and as the tracer moves in the direction of the arrow the image of the tracer moves downward from the slit edge 75 toward the slit edge 76. Upon further movement of the tracer in the direction of the arrow the image is focused by the optic 72 on the center opaque slit plate and thus no light impinges upon the photo-electric surface 79. As the tracer 71 moves upward vertically in the direction of the arrow eventually the optic 72 will focus the image of the tracer at the slit edge 71 and upon more movement of the tracer the tracer will be focused within the slit 73 and finally pass downward vertically past the slit edge 78. During the presence of the image of the tracer within the slit 73 the photo-electric surface is activated generating a current. The signal or signals generated by the configuration shown in FIGURE 6 are depicted in FIGURE 7. As the image of the tracer moves downward from the slit edge 75 and begins to enter the slit 74 a current is generated commencing at $I_{s1}$ and the current continues to climb to the point $I_{c1}$ at which point the tracer is entirely within the slit 74. As the tracer moves upward vertically its image slowly disappears behind the slit edge 76 and the photo-electric surface 79 is no longer activated. And the signal current decreases as shown in the downward slope of the first hump of the signal current. As the tracer image begins to enter the slit 73 the signal current is shown by the curve $I_{s2}-I_{c2}$. As the image of the tracer begins to leave the slit 73 the signal current is indicated by the downward slope of the second hump of the signal. The signal current $A_m$ is the peak current generated by the tracer when it is entirely within the slits 73 and 74.

To obtain the time interval for the tracer to traverse a measured path of two separate measurements can be made: (1) the intersection of an arbitrary current value $A_s$ with the up-slope of each of the current humps as indicated by the positions $T_s$ and $T_e$. Thus, the time period between $T_s$ and $T_e$ is the time necessary for the tracer image to cover a path equal to the width of the slit 74 plus the width of the center slit bar between the slit edge 76 and the slit edge 77. By knowing the distances and the time involved the velocity can be readily computed. Likewise, the time interval can be determined by measuring between identical points on the downward slope of these humps. This is indicated by the arbitrarily chosen signal current value $A_{s2}$ which intersects the downward slope of the first signal hump at point $T_{s2}$ and the downward slope of the second hump signal at $T_{e2}$. The time interval between $T_{s2}$ and $E_{e2}$ is the time period required for the tracer image to cover a distance equal to the width of the slit 73 plus the width of the center slit bar between the edges 76 and 77.

In FIGURE 8 I have shown a further modification of my invention in which a tracer 81 emits or reflects light to an optic 82 which focuses an image of the tracer at or near a point adjacent to edge 84. A photo-electric surface 86 is activated by the tracer image. A transmitting mirror 87 is interposed in the path of the focused light and reflects and focuses a second image of the tracer at or near point 88 adjacent a slit edge 89 and activates the photoelectric surface 90.

As the tracer 81 moves vertically upward in the direction of the arrow of FIGURE 8, the image of the tracer moves downward vertically to the edge 84 and generates a curve $S_1$ as shown in FIGURE 9. The curve from the point $I_{s1}$ to $I_{c1}$ is the current generated during the time period when the image of the tracer is coming into view and is not wholly past the edge 84. When the tracer image is wholly past the edge 84, a maximum current $A_m$ is generated as depicted by the flat top portion of the curve $S_1$.

If a second edge is placed in the position 85 as shown in FIGURE 8, the tracer 81 moves vertically upward and the image approaches the edge 85 and the activation of the photo-cell 86 commences to decrease. This decrease in the current is depicted by the curve $S_2^1$ of FIGURE 9. It should be noted that the combination of the curve $S_1$ and $S_2^1$ is substantially similar to the entire curve shown in FIGURE 5 with the exception that the curve $S_2^1$ has been shifted to the left on the illustration of FIGURE 9 from its analogous position between $O_s$ and $O_c$ of FIGURE 5.

During the movement of the tracer 81 in the upward vertical direction of FIGURE 8 as shown by the arrow the image of the tracer 88 which is reflected from the mirror 87 moves from left to right until it begins to appear at the edge 89 and commences to generate a current in a photo-electric cell 90. The curve generated by this movement of the image is shown in curve $S_2$ of FIGURE 9. The area of the curve from $I_{s2}$ to $I_{c2}$ depicts the increase in the signal current as the image moves into view from behind the edge 89 and commences to generate a current in photo-electric cell 90. When the image near 88 is completely in view the current generation of curve $S_2$ is at a peak value $A_m$.

The construction shown in FIGURE 8 is particularly useful for tracers that are of a size greater than the width of an effective slit which is composed of edges 84 and 89 or alternative edges 85 and 89. The construction of FIGURE 8 is also particularly useful when the tracer is not focused near the edges, but rather in a plane in front of or in back of the edges. The curves $S_2$ and $S_2^1$ are functionally alike if alternative edge 85 occurs just at edge 89. Then the signal $S_2$ is the same when measured up from ordinate value A as the signal $S_2^1$ is when measured down from ordinate value $A_m$ at equal abscissa values of time.

To obtain the time interval for the tracer to traverse a measured path between the edges of the previously described effective slit either the combination of signals $S_1$ and $S_2$ or the combination of signals $S_1$ and $S_2^1$ may be used. To use curves $S_1$ and $S_2$, the intersection of an arbitrarily chosen current value $A_s$ is taken with both signals $S_1$ and $S_2$ at time $T_s$ and $T_e$ respectively. The time interval from $T_s$ to $T_e$ is the time period for the tracer image to traverse the effective slit. To use curves $S_1$ and $S_2^1$ the intersection of $A_s$ is taken with $S_1$ at time $T_s$. The intersection of a current $A_e$ (chosen such that the amount of current from $A_m$ down to $A_e$ is equal to the amount of current from A up to $A_s$) is taken with signal $S_2^1$ at $T_e$. This measurement yields a time interval measured from $T_s$ to $T_e$.

In FIGURE 11, I have shown the basic electronic circuit arrangement including the photo-electric unit (such as a cell or tube) 100 which supplies a current to an amplifier 101 which in turn supplies the amplified current to a balanced inverter 102 and hence along one path to a voltage discriminator 103 and to a time interval meter 104; and from the balanced inverter 102 to a diode fast learning circuit 105 to a second voltage discriminator 106 and hence to the time interval meter 104. Preferably, but not necessarily, the time interval meter 104 is supplied to a data storage unit 107.

The basic system which I have described above provides measurements of time, of movement, of a tracer over a path of known length. This measurement is only of one component of velocity unless, and this would normally be purely fortuitous, the component which is measured is the total velocity of flow. To measure velocity completely, three such systems are used so that the view sheets, that is the space between planes passing through the center of the optic and the two edges of the slit, are arranged to measure in independent directions and intersect at the space to be studied. The usual practice in fluid dynamics is to consider and measure mutually orthogonal components of velocity. Then the intersection of sheets would define a particular space which is approximately a cube. This arrangement is shown in FIGURE 10.

Actually a viewing sheet, as described above, is a thin wedge whose sides diverge from a line which is perpendicular to the optical axis and passes through the affected center of the viewing optic. This viewing optic has been called the "collecting lens" in the above description.

I have shown the sheets as viewing sheets X, Y and Z in FIGURE 10.

An observation, collectively from these three viewing sheets X, Y and Z specifies not only magnitude or description of the flow, but also its location in space and time.

When using the three viewing sheets as depicted in FIGURE 10 it is preferable that the tracer being measured pass through the small cube formed at the intersection of the three sheets. Consequently, a measurement rejection will preferably have to be made which will reject any measurements made when there is not a simultaneous activation of each of the three photo-cells. This coincidence detection, as I refer to the simultaneous activation of the three photo-cells, is a routine matter using electronic techniques. One method is to use a circuit which is set to reject measurements if a summing circuit receives insufficient signals to trigger the reject to accept. Absence of one signal from one of the photo-cells viewing in any of the plans X, Y or Z to the summing circuit would preserve the reject condition. A second circuit which could be used, and this circuit is perhaps more positive, would detect three "in" pulses (that is, the pulses generated when a tracer starts to activate each of the three photo-cells) which trigger flip-flops. If an "out" pulse is interposed to stop counting the total count would not reach three, indicating lack of coincidence and consequently rejection.

Knowing the signals, and consequently velocity in the three directions, and two intervals between any of the three measured intervals, the linear path of the tracer can be readily deduced from known geometrics relations.

The conversion of the luminous signal emitted or reflected from the tracer into an electrical signal upon which certain functional operations may be performed can be carried out by a multiplier photo-tube of well known construction.

The basic functions of the electrical components in obtaining a measurement in the sequence and manner depicted in FIGURE 11 are typical and preferred for many applications. There are, however, many useful variations and abbreviations of the functions of the electrical components which do not alter the logic of operations to obtain a measurement. For example, FIGURE 11 depicts the basic arrangement of the electrical components and their functions which are useful when the conditions and arrangements of FIGURES 4 and 5 are practiced. The electrical components 102, 105 and 106 and their functions are not necessary when the conditions and arrangements of FIGURES 6 and 7 are practiced. The components 102, 105 and 106 and their functions may be omitted in each of the two measuring arrangements following the two photo-electric surfaces 86 and 90 in FIGURE 8, when the conditions and arrangements represented in FIGURES 8 and 9 are practiced. However, each of the two voltage discriminators 103 and 106 are then applied to a single, common time interval meter 104. Generally, it is apparent that if there is a distinct configuration or character to any of the signals depicted in FIGURES 5, 7 and 9, then there is a similar, analogous configuration or character in the first or higher derivatives of the signal with respect to time. These derivatives of signal current may be used instead of the signal currents depicted for the same purposes in the same ways as described herein. Thus, an additional electrical component and its function of differentiation, which is well-known, can be added anywhere before the voltage discriminators 103 or 106. Such an arrangement is not regarded as preferable in most uses because accuracy is reduced when distinguishing differentiated noise from differentiated signal current.

Another example of variation of the basic electrical arrangement is the insertion of a storage device, such as a magnetic tape on which the signal after amplification or the pulse output of a discriminator is recorded. Such storage may serve useful purposes as for example slow playback of signal producing inherently better resolution of time interval. Or it may avoid the necessity of duplicating the interval measuring equipment in combinations of the basic system as described herein.

An example of an abbreviation of the functions is the use of an oscilloscope or oscillograph for display of the amplified signal from amplifier 101, or from the outputs of 103 and 106 on a tracer such that distance is proportional to time as in the FIGURES 5, 7 and 9.

Also it may be desired to add functions which record absolute time when measurements are taken. This is useful in evaluating transient flows.

Methods of obtaining observations which are statistically constant in time, though the flow is transient, do not involve essentially more complicated techniques than those already described in the first part of this application. In the basic system and its compounds, which have been described for the complete system and for obtaining correlation functions—or even derivatives—with respect to space and time, the quality is inherent that universal time as such is not recorded. The observations, which are actually the various time intervals such as $\tau$, $\tau_i$ and $\tau_{ij}$, are registered on a time interval meter and transcribed to record in any manner convenient to the observer. This process consumes time if the observer writes the data, records it photographically, by punched tape "read out" or in any other manner. Thus a sequence of measurements are not necessarily closely spaced in time, a fact which is not important thus far. However, more restrictive requirements are imposed in measurement of transients which are not statistical.

For the more general transient flows, what is generally required is a measurement of velocity which is continuous in time. The fact that the technique which is the subject here depends on tracers randomly entering a path on which time interval of flight is measured immediately makes continuous measurement impossible. If, however, the fluid is rather densely populated with tracers, interval measurements recorded quickly, and an universal time—one referring to a continuously progressive system of time—recorded at a standard point of each tracer flight interval, say the "in" time, then useful measurements of transient flows may be made. Although not continuous, a rapid succession of measurements could be extrapolated to a continuous record of velocity with time. The key requirement is rapid recording of both interval and the time from some clock. The degree of rapidity is quite naturally relative to the application. And the means of enlarging the technique to provide this rapidity is governed accordingly. Because this aspect of the total problem of velocity measurement does not contain criteria for a common approach, only a few solutions will be sketched and then will not be considered further.

First, if the transient is very slow, an observer may simply note time intervals and a clock, record these readings, then restore the interval meters and wait for the next observation. For somewhat faster phenomena, all recording might be automatic. Since the interval meter is required to have high resolution, it is likely to store data as the "0" or "1" status of a group of elements ordered into some number system. Commonly the binary, and decade systems are used, though others are available (e.g., step counters, fed back binary groups, etc.). The system best conserving equipment and giving maximum use for an array of storage points is the binary system. Data, in the form of high or low voltage bits, can be transcribed in a number of ways. The second method then could be by punched tape which reads the binary number of the interval meter and simultaneously the time of a clock. A third method like this could record on a magnetic tape, all the readings. A fourth method also might be the recording of intervals, each in its own channel on a magnetic tape moving at a constant speed or containing recorded clock markings. A fifth method might utilize a constant, very high speed magnetic tape to record only "in" and "out" impulses directly, and in this way bypass temporarily the interval meter. Timing impulses could also be used in a separate channel. Care would be required to identify "in" and "out" pluses. The data could then be retranscribed with a low speed playback using an interval meter and recording of data by hand, or the slower punched tape.

An additional technique, using digital computer types of storages not only would provide an inherently fast method of recording intervals and electronic counter clock times in transient flows, but also would be ideal for applications involving statistical measurements. In this scheme, the interval meters could read out into a computer memory upon receipt of a third "out" pulse from the system and reset or not, be ready to immediately measure on another tracer. Clock readings would be made simultaneously. Pairs or groups of binary numbers corresponding to one complete observation would be addressed according to the computer read-in code. The operations necessary for computation of velocity, path, correlations and so forth could be carried out rapidly on the computer, perhaps even simultaneously, emptying the computer storage of data and allowing the data processed to be large compared with the computer storage. Because the storage need not be large, and because the operations required are not complex, a very small computer would be all that would be required. Summing up, a variety of schemes for adding to the technique are available and because of them, there is but slight limitation in the application to general transient flow; there is, however, added complexity and with it the disadvantages which accompany complexity.

*Electronic operation*

A number of photo-electric materials which are used in photo-tubes have the property of releasing free electrons when energy in a luminous spectrum is received. However, the current resulting at the photo-tube when light is received from tracers of extremely small size, is quite small. Thus, if measurements are to be made there must be a large amplification of the electrical signal before electronic operations can be employed to measure the interval of the signal resulting from a tracer crossing the viewing sheet. Such amplification to the degree needed would result in such a low signal to noise ratio if performed with ordinary vacuum tube amplifiers that the tracer size would have to be increased to the point where response of tracers to the flow characteristics might be very poor.

The photo-multiplier type photo-tube obtains current amplification in the order of $10^6$ with no attendant coupling resistor noise and little shot effect noise. The operation of the photo-multiplier type photo-tube is well-known. Typical of such tube is the RCA type 6810–A. One important consideration in using the photo-multiplier tubes is that a source of constant voltage must be supplied to the tube. Such constant voltages can be supplied from batteries or rectifier power supplies. I have found that a rectifier and voltage divider circuit should preferably be used with the photo-multiplier tubes. Such a circuit is well-known.

The electrical signal from a photo-multiplier tube due to a tracer crossing a viewing sheet has been previously described and shown in FIGURE 5. The result of electronic operation on this signal from the photo-multiplier tube must be to generate a pulse to start a time interval measurement when the signal has reached some amplitude on the "in" portion of the curve, i.e., the portion from $I_s$ to $I_c$, and a second pulse when the signal has come down the same amplitude on the "out" portion of the curve, i.e., part $O_s$ to $O_c$, to stop the interval measurements. Then the interval of time measured will correspond properly with the length.

Before these operations are performed the signal must first be amplified, then split, and one branch inverted so that detection may proceed on the "in" and "out" portions of the curve separately and in the same sense. If all tracers were the same size, then it would be possible that the maximum amplitude of signals due to all tracers would be the same. Proper adjustment of the pulse generating operation might then enable one unit to generate both pulses. However, the size distribution can never be perfectly uniform; and, therefore, the splitting technique must be used.

With amplitude discrimination it becomes necessary for the inverted signal to be restored before the "out" portion of the curve occurs. The restoration, furthermore, must occur in a relatively short interval between the time the tracer enters the viewing sheet and the time when an illuminated part of it just begins to leave. The process of fast restoration will be called learning (of the maximum signal level).

The function of the two amplitude discriminators 103 and 106, one for the "in" or "start" pulse generation, the other for the "out" or "stop" is to accept the signal like that in FIGURE 5 and at some fixed voltage on the increasing portion of the signal cease quiescent operation so that the output is a change in voltage occurring when the signal passes a predetermined amplitude, or equivalently a predetermined luminous flux. From such an output, a pulse may easily be generated. These pulses, one for "in" or "start" and a second for "out" or "stop", control a time interval meter. FIGURE 11 is a functional diagram of the operation just described.

A problem which is encountered is sorting out measurements made with two tracers occupying the viewing sheet at the same time and causing an effective observation on the two. The maximum amplitude of a signal due to one tracer is dependent on its size. Thus, if there is an amplitude detecting voltage which is less than the sum of the maximum signal voltage of two tracers, a substantial number of the erroneous readings due to the presence of two tracers in this viewing sheet can be discarded by using such detections as a basis for automatic rejection of a measurement.

A second function which must be provided by electronic operation is that of coincidence detection which must be made when the complete system as shown in FIGURE 10 is used for a tracer which passes through a cube of three intersecting viewing sheets, the three "in" or "start" impulses from the three viewing systems must all occur before the three "out" or "stop" impulses. The "start" and "stop" impulses are separately generated in an electronic operation so that they can retain their identity when used for coincidence detection. A device which will perform the necessary function here is primarily a counting circuit of the type composed of two flip-flop circuits whose input is three start impulses. The output of the flip-flops is a signal which controls a gate such that the gate may pass a signal applied to it during the time interval between the first and third start impulses. If the stop impulses are the input to the gate, they are passed only if one or more of them occurs before the third start impulse. The gate output, a pulse or pulses if there is not coincidence, serves to activate circuits which rejects a measurement by some means. Such counting circuits are well-known, likewise a circuit which will reject such a measurement that does not have coincidence is also well-known.

"False start" is one further problem that may be encountered in the use of my invention. The time interval meter is generally unable to distinguish between "start" and "stop" pulses and consequently may measure not the interval of time of flight of a tracer through a viewing sheet but rather that from the exit of one tracer to the entrance of another. Such occurrences are easily detected if "stop" pulses are applied to a flip-flop circuit which in changing its state blocks further signals. This flip-flop circuit is applied in such a way as to bring all operations to quiescence until reset. During normal operation, this flip-flop circuit also permits recording at any rate whatever with no further interval measurement possible until this locking effect is removed by a manual or automatic reset signal.

In the amplification of the signal from the photo-multiplier tube the total amplification was arbitrarily set as that required to raise the amplitude of the signal from the photo-multiplier tube with a signal to noise ratio of 1 to a level of 100 volts when the photo-multiplier tube is an average tube number 931–A operating at 1000 volts. The photo-multiplier anode, essentially a current source, has a capacitance of 5–7 micromicrofarad to all other electrodes. The load, a grid-resistor, then is shunted by the average of 5–7 micromicrofarad, plus the wiring and amplifier input capacitance. Pentode amplifiers were used whose input capacitance was in the order of 4 or 5 micromicrofarads. Then for proper band width an 8.2K resistor was used so that for a maximum anode dark current of 0.1 microampere, a net gain of about $10^5$ was required for a signal out of the amplifier of 100 volts.

The design of the amplifier stages is well-known. Because the amplifiers may be required to reproduce signals having a rather long interval, and since slope-off in the signal will cause error in proper time interval "stop," as good a low frequency response as possible is required. Use was not made of D.C. amplifiers except in the preamplifier associated with the photo-multiplier because such circuits become complicated for very many stages. However, a "bass boost" compensation was used to counter the effect of high impedance at low frequencies in the coupling capacitor. Use of a large coupling capacitor is limited by its contribution to the high frequency shunting capacitance. Use of a large grid-resistor is restricted by the possibility of positive ion regeneration for grid-resistors larger than about 1 megohm.

The amplifier group which I have used includes first a stage directly coupled to the photo-multiplier anode and whose output is directly coupled to a pentode cathode follower which serves to lower impedance in order that the signal may be brought via coaxial cabling to the remaining electronic apparatus. The cathode follower is essentially triode connected at low frequencies. At the higher frequencies, a capacitance couples the second grid to the cathode so that the net input capacitance is particularly low at the high frequencies. Because of this innovation, the parasitic capacitance loading the first amplifier is particularly low, and hence it may be operated at a higher gain than remaining amplifiers.

The band width of individual amplifiers necessary to produce a net band width of 10 megacycles follows a description in a book entitled "Electronics," by W. C. Elmore and M. Sands, published by McGraw-Hill Book Company, Incorporated, in 1949. The band width used for design is 14.5 mc. A total of four stages of amplification was required to attain the total gain in band widths mentioned. The first stage had a gain of about 50 and the remaining stages a gain of 15 per stage. The total gain was approximately $1.7 \times 10^5$. Besides the two methods of controlling gains which were associated with the photo-multiplier stage, a potentiometer, part of the load of the cathode follower, was used to vary gain of the amplifier group. The band width gain product was increased by using an optimum combination of shunt and cathode feedback compensation.

Most of the details concerning the selection of circuit component values for the amplifier and other functional stages are described in the above book or in a further publication entitled "Electronics Designers Handbook," by R. W. Landee, D. C. Davis and A. P. Albrecht, published by McGraw-Hill Book Company, Incorporated, in 1957.

After four stages of amplification, the signal, that resulting from a tracer passing through a viewing sheet, resembles a single negative square wave. Inversion was used so that both the "start" and "stop" discriminator action takes place on a positive going wave form. In this way, any lags present in the electronic functions were identical and compensating, and introduced no net error in the time interval measured.

A split load triode (6BK7) inverter was selected since balance output and good response characteristics were assured.

The signal taken from the cathode of the inverter was sent to a cathode follower which minimized the shunting capacitance and served to drive the learning circuit.

The learning circuit consisted of three capacitors, two resistors and a diode (6AL5). The signal which was presented to the learning circuit was approximately a negative square wave. As the voltage fell the coupling capacitor discharged through the series resistance of one of the resistors and the diode. Thus, during the time the tracer crossed a viewing sheet, the voltage at the grid of the amplitude discriminator first fell then rose again to the reference level as the coupling capacitor discharged. This is the learning process. Then as the signal voltage from the cathode follower rose during the tracer's "out" transient the diode acted as an infinite resistance and the voltage to the discriminator rose across the relatively large resistance of one of the resistors. The ratio of the time constant for the rising or "out" transient to that of the falling or "in" transient was in the order of 200, the ratio of the effective resistances. Thus, learning took place 200 times faster than restoration after the exit signal. Effectively, this meant that for the transient in the same order length as the time of the tracer flight interval, only in the order of 1% loss in response might occur. Three coupling capacitors were used so that any range of interval could be selected and there would still be complete learning and adequate response to the transient.

For amplitude discrimination, I have selected the circuit which is called the Schmitt trigger circuit. It employs two amplifier-type tubes in a bistable arrangement such that at a critical voltage of the input, the first stage starts to conduct, whereupon the second stage ceases conduction. Because of loop regeneracy, the flip-over action is very fast. The input is conveniently referred to some voltage so that triggering is initiated at any amplitude or signal coupled from the branches of the inversion or learning circuit. Voltage discrimination is reliably made in less than 0.1 volt out of perhaps 100 volts with no great difficulty. Use of very stable circuit components may even extend the reliability if this is found necessary in the application.

The Schmitt trigger circuits involve the following: A complete signal is coupled from the inverter stage to the grid of the first Schmitt trigger stage by a capacitor. The reference voltage is developed by dividing the supply voltage across four resistors. Provision is made in the divider for adjusting the resistance so that the reference voltage may be read directly on a linear scale. A second capacitor serves to filter all effects of signals from the referencing circuit. Normally, when no signal is present, the grid of the second stage is held at a high potential by the divider using four resistors. Thus, the second stage is conducting, drawing current through a fifth resistor. The first stage is biased below cut-off by the reference voltage and cannot conduct. As the signal increases, the first stage begins to conduct, lowering the voltage at its plate. This amplified signal is coupled to the second stage by three of the resistors and a third capacitor. As the second stage conducts less, a regeneration is initiated which causes the change to proceed very fast. The speed of the triggering is dependent not only on the speed of the transient input signal and regeneration, but also on the high frequency response of the two stages as they operate like amplifiers. Since, to a large degree, they operate like cathode followers, the response is inherently good. However, care was taken to use pentodes rather than triodes, a high merit tube-type (6CB6) and small values of plate load resistors. In addition, the third capacitor was used to insure constant divider impedances at all frequencies.

The output of the two Schmitt triggers, which generate "start" and "stop" pulses at the plates of their second stages from "in" and "out" transients, respectively, were coupled to two cathode followers which served to match impedance for driving the impulses through coaxial cable to the time interval meter. The cathode followers were standard design, modulized circuits, which are commercially available. After the cathode followers, the pulses were mixed together to drive the single input of a time interval meter.

In using the present invention in measuring only one dimensional fluid velocity component, coincidence detection was not required and all faults were controlled using circuits to detect double tracers or large tracers and ones to detect "stop" pulses. The latter requirement prevents "false start" if in the detection there is also squelching of the circuit after a "stop" pulse so that an interval measurement which is started on an "out" transient is never stopped. The "false start" condition was then recognized in this way and reset was accomplished manually.

A circuit to perform these functions is well-known and is as follows: The "stop" pulses and double or large tracer pulses are coupled from their respective Schmitt trigger circuits to the input of identical flip-flops. The flip-flop circuits are standardized high-speed bistable multi-vibrators designed to operate in binary fashion above 1 megacycle. They are commercially available, modulized, plug-in units operating from 150 volts. A type OA2 gaseous regulator tube was employed with dropping resistors to supply 150 volts from the 300 volt supply which was used for other circuits.

One plate of each flip-flop was loaded in addition to its plate load resistor by a small neon lamp which indicated the state of the flip-flop. Reset of the flip-flops was accomplished by removing one grid resistor from ground using a telephone-type key switch, thus driving that stage into conduction.

The flip-flop which accepted "stop" pulses, besides indicating "stop" on the neon lamp, also controlled a triode (½ 12AU7) stage which was loaded by a relay. Change in the state of the flip-flop due to receipt of a "stop" pulse caused the potential of the grid of the relay control triode (divided between flip-flop plate and three resistors) to increase, energizing the relay whose switching action grounded the input to the first stage amplifier of the main electronic group. An alternative procedure is to use a gate stage controlled by the control triode instead of the grounding relay.

The effect of the capacitance of the grounding bus and relay contacts on the amplifier response was negligible since the signal is transmitted with a very low impedance from the preamplifier to the first stage of amplification in the main group.

An additional resistor served to energize the relay during the resetting process and, therefore, prevented any false signals from initiating a measurement in the brief time that the double tracer and "stop" pulse circuits were inoperative.

The power supplied to all electronic functions was filtered and regulated at 300 volts. The first amplifiers operated at low signal levels due to small photo-multiplier currents and so required a supply of direct current from a source presenting little or no A.C. hum. Power was supplied from a standard full-wave rectifier circuit using a type 5U4 rectifier.

While I have described a present preferred embodiment of my invention, it may be otherwise embodied within the scope of the following claims.

I claim:

1. The method of determining a component of fluid flow velocity of a fluid that contains tracers which radiate light and are optically distinguishable from and responsive to variations in fluid flow comprising:
   (a) positioning a sensing device adjacent said flow that is disposed to continuously detect the radiated light of said tracers along said flow;
   (b) shielding a predetermined portion of the radiated light emitted by tracers along said flow that is detectable by said sensing device so as to define a predetermined path within said flow wherein said device may continuously detect the radiated light of individual tracers within said flow; and
   (c) determining the time period for individual tracers to traverse said predetermined path by measuring the time period which said sensing device detects said individual tracer.

2. The method of claim 1 wherein said sensing device is disposed to generate an electric signal, the intensity of which is proportional to the area of the individual tracers exposed to the sensing device as said tracers traverse said predetermined path and said time period (c) is determined by measuring the intensity and duration of said signal.

3. The method according to claim 1 wherein said tracers are disposed to reflect light and said predetermined path is illuminated so that said radiated light is reflected light.

4. The method according to claim 1 wherein said sensing device is disposed to generate an electric signal, the intensity of which is proportional to the area of the individual tracers exposed to the sensing device as said tracers traverse said predetermined path and said time period (c) is determined by determining the duration and intensity of the signal from the time the signal reaches a predetermined value less than its maximum value until it decreases from its maximum value the same predetermined value.

5. A method according to claim 2 wherein an optic is positioned between said sensing device and said fluid flow, said optic being disposed to collect said radiated light from said tracers and focus images of said tracers at said shielding and said shielding consisting of a light impermeable member formed with a slit, said light impermeable member being positioned between said optic and said sensing device so as to restrict the area within said flow wherein said sensing device will sense the presence of tracers within the said flow to the area wherein said light will pass through said slit, the elongated sides of said slit defining said predetermined path and said time period being determined by measuring the time period necessary for the image of individual tracers to move from a first position partly within the slit, across the slit to a second position partly outside the slit, said image of the individual tracers being in the same relative positions with respect to the sides of the slit when in said first and second positions.

6. Apparatus for determining a component of fluid flow velocity of a fluid that contains tracers which radiate light and are optically distinguishable from and responsive to variations in fluid flow comprising:
   (a) sensing means positioned and disposed to continuously detect said radiated light; and (b) shielding means disposed to define a predetermined portion of said radiated light that is detectable by said sensing means so that said sensing means may continuously detect individual tracers in said fluid flow only while they are within the predetermined viewing area defined by said shielding means.

7. The apparatus as in claim 6 wherein said sensing means is disposed to generate an electric signal, the intensity of which is proportional to the area of the individual tracer exposed to said means.

8. Apparatus according to claim 6 wherein said sensing means is a photoelectric surface which translates the radiated light into electric responses; first means operatively connected to said surface to amplify the responses; inverter means operatively conected to said first means to split the response into two signals and to invert one of the signals; a voltage discriminator operatively connected to the inverter means to receive one of the signals and emit an energizing signal to time measuring means at a preselected amplitude; a learning circuit operatively connected to the inverter means to receive the remaining signal and restore the maximum amplitude of the signal to the reference level; a second voltage discriminator operatively connected to the learning circuit to receive and emit a second energizing signal to said time measuring means at said preselected amplitude, and said time measurement means operatively connected to both voltage discriminators to receive the signals therefrom and measure the duration of the signal.

9. Apparatus according to claim 6 wherein means are provided to illuminate the area of said fluid flow defined by said shielding means so that light reflective tracers will radiate reflected light to said sensing means.

10. Apparatus according to claim 7 wherein a light collecting optic is positioned between said fluid flow and said shielding means that is disposed to collect said radiated light and conduct it to said sensing means.

11. The method of determining a component of fluid flow velocity of a fluid that contains tracers which radiate light and are optically distinguishable from and responsive to variations in fluid flow comprising:
(a) positioning a sensing device adjacent said flow that is disposed to continuously detect the radiated light of said tracers along said flow, said sensing device being disposed to generate an electric signal, the intensity of which is proportional to the area of individual tracers exposed to said device;
(b) defining two spaced areas within said flow in which radiated light emitted by said tracers is detected by said sensing device by shielding predetermined portions of said radiated light so that said sensing device detects the radiated light of individual tracers sequentially within both said areas in said flow, said areas defining a predetermined path within said flow; and
(c) determining the time period for individual tracers to traverse said predetermined path by measuring the output signal from said sensing device, said signal having two maximum values, each separated by a minimum value; and measuring the duration of the signal from the time said signal reaches a predetermined value less than its first maximum value until it decreases to said minimum value and again increases to said predetermined value less than the second maximum value.

12. The method of determining a component of fluid flow velocity of a fluid that contains tracers which radiate light and are optically distinguishable from and responsive to variations in fluid flow comprising:
(a) positioning two sensing devices adjacent said flow each disposed to continuously and substantially simultaneously detect the radiated light of tracers along said flow, said sensing devices each being disposed to generate an electric signal, the intensity of which is proportional to the area of the individual tracers exposed to the sensing device;
(b) shielding a predetermined portion of the radiated light emitted by tracers along said flow that is detected by each of said sensing devices, said shielding being disposed to first shield one said sensing device from detecting said radiated light and second shielding the other said sensing device for detecting said radiated light, said first and second shielding being spaced so that individual tracers are detected by one of said sensing devices in advance of the other, said spaced shielding defining a predetermined path within said flow;
(c) determining the time period for individual tracers to traverse said predetermined path by measuring the output signals from said sensing devices, from a time period commencing when one of said signals reaches a predetermined value until the other said signal reaches said predetermined value.

13. The method of determining a component of fluid flow velocity of a fluid that contains tracers which radiate light and are optically distinguishable from and responsive to variations in fluid flow comprising:
(a) continuously collecting reflected light from individual tracers in said flow with an optic, disposed to transmit and focus said light at a spaced distance from said optic;
(b) positioning a sensing device to continuously detect said transmitted light spaced from said optic a greater distance than said focus, said sensing device being disposed to generate an electric signal, the intensity of which is proportional to the area of individual tracers exposed to said device;
(c) inserting shielding means between said optic and said sensing device in the area of said focus, said shielding means defining two spaced openings wherein said transmitted light is within the view of said sensing device so that said sensing device detects the radiated light sequentially within both said openings, said openings defining a predetermined path within said flow; and
(d) determining the time period for individual tracers to traverse said predetermined path by utilizing and correlating the first and second sequential signals of individual tracers radiating light sequentially through said openings.

14. The method of determining a component of fluid flow velocity of a fluid that contains tracers which radiate light and are optically distinguishable from and responsive to variations in fluid flow comprising:
(a) illuminating a portion of said fluid flow with light so that said tracers radiate light;
(b) positioning a collector optic along said illuminated flow so that it collects reflected light from individual tracers and transmits said collected light;
(c) positioning a reflector optic to receive said transmitted light and reflect a portion of said light and transmit a portion of said light;
(d) positioning a first sensing device to detect said reflected light, said sensing device being disposed to generate an electric signal, the intensity of which is proportional to the area of individual tracers exposed to said device;
(e) partially obstructing said reflected light from said first sensing device with a first opaque shield member so that an edge of said member vertically obstructs a portion of said reflected light;
(f) positioning a second sensing device to detect said transmitted light, said sensing device being disposed to generate an electric signal, the intensity of which is proportional to the area of individual tracers exposed to said device;
(g) partially obstructing said transmitted light from said second sensing device with a second opaque shield member so that an edge of said member vertically obstructs a portion of said transmitted light, said portion differing from the portion shielded by the first shielding member partially obstructing the reflected light to said first sensing device, said first and second shielding members defining a predetermined path within said flow starting where neither said sensing devices detect said individual tracers to where both said sensing devices detect said individual tracers;

(h) determining the time period for individual tracers to traverse said predetermined path by measuring the output signals from said sensing device commencing when one of said signals reaches a predetermined value until the other signal reaches said predetermined value.

15. The method of determining a component of fluid flow velocity of a fluid that contains tracers which radiate light and are optically distinguishable from and responsive to variation in fluid flow comprising:

(a) positioning a sensing device adjacent said flow that is disposed to continuously detect the radiated light of said tracers along said flow, said sensing device being disposed to generate an electric signal, the intensity of which is proportional to the area of individual tracers exposed to said device;

(b) defining two spaced areas within said flow in which radiated light emitted by said tracers is detected by said sensing device by shielding predetermined portions of said radiated light so that said sensing device detects the radiated light of individual tracers sequentially within both said areas in said flow, said areas defining a predetermined path within said flow; and (c) determining the time period for the individual tracers to traverse said predetermined path by measuring the output signals from said sensing device, said signal having two maximum values, each separated by a minimum value, and measuring the duration of the signal from the time it decreases from its first maximum value to a predetermined value less than its first maximum value until it decreases from its second maximum value to said predetermined value less than the second maximum value.

References Cited by the Examiner

UNITED STATES PATENTS

| | | | |
|---|---|---|---|
| 2,333,791 | 11/43 | Hutchison | 73—194 |
| 2,419,914 | 4/47 | Pamphilon | 250—218 X |
| 2,599,975 | 6/52 | Carpenter | 250—218 X |
| 2,626,361 | 1/53 | Martine | 250—218 |
| 2,637,206 | 5/53 | Atkins | 73—194 |
| 2,640,936 | 6/53 | Pajes | 73—194 |
| 2,682,613 | 6/54 | Uhl | 250—218 |
| 2,925,007 | 2/60 | Silver | 250—218 X |
| 2,960,908 | 11/60 | Willits et al. | 250—219 |
| 2,967,450 | 1/61 | Shields et al. | 73—194 |

RICHARD C. QUEISSER, *Primary Examiner*.

A. GAUSS, ROBERT L. EVANS, *Examiners*.

UNITED STATES PATENT OFFICE
CERTIFICATE OF CORRECTION

Patent No. 3,199,346                      August 10, 1965

William A. Stewart

It is hereby certified that error appears in the above numbered patent requiring correction and that the said Letters Patent should read as corrected below.

Column 4, line 3, for "of fluctuations" read -- to fluctuations --; column 10, line 4, for "of .01 inch" read -- is .01 inch --; column 11, line 44, for "of two" read -- either of two --; same column 11, line 59, for "$E_{e2}$" read -- $T_{e2}$ --.

Signed and sealed this 1st day of February 1966.

(SEAL)
Attest:

ERNEST W. SWIDER                      EDWARD J. BRENNER
Attesting Officer                      Commissioner of Patents